FILTER

Filed March 29, 1962

INVENTOR.
WILLIAM W. GARSTANG
BY
Gerrit D. Foster
ATTORNEY

United States Patent Office 3,289,118
Patented Nov. 29, 1966

3,289,118
FILTER
William W. Garstang, Milwaukee, Wis., assignor to Globe-Union Inc., Milwaukee, Wis., a corporation of Delaware
Filed Mar. 29, 1962, Ser. No. 183,429
10 Claims. (Cl. 333—79)

The invention relates to a broad band filter.

The useful range of presently available filters is limited, in one aspect, by the capacitance which can be achieved within the space limitations imposed on filters, the general useful range being approximately fifty to several thousand megacycles. The maximum capacitance presently obtainable is on the order of 2M to 5M pf. which is insufficient for providing attenuation at frequencies much below 50–100 megacycles. Another limiting aspect of presently available filters is that the usual ferrite element, or elements, only become effective at frequencies above 50–100 megacycles.

A general object of this invention is to increase the useful range of a filter while improving the effectiveness of the filter within the increased range and without increasing its size. To accomplish these and other objects it is proposed to utilize a reduced titanate capacitor construction for the filter capacitor thereby achieving a marked increase in capacitance value. For capacitors of comparable size, the ratio of capacitance of a reduced titanate capacitor to that of a conventional capacitor is approximately 100 to 1.

Still another object of this invention is to improve the low freqency characteristics of a filter. This is also accomplished, in part, by the reduced titanate capacitor construction and can be further improved by substituting iron powder or a combination of iron powder and ferrite for the usually provided pure ferrite elements.

A further shortcoming of presently available filters lies in the fact that within its useful range certain bands exist where a reduction in the effectiveness of the filter will occur. In filters incorporating more than one capacitor, such as pi-section filters, the capacitors become resonant at certain frequencies rendering them incapable of filtering. A further object of this invention is to reduce the areas within the useful filter range where this reduced effectiveness occurs thereby improving the operation of the filter throughout its useful range. To accomplish this object it is proposed to provide filter capacitors of different capacitance values, i.e. a cascaded filter which is relatively deresonated.

The novel features of this invention are set forth in the appended claims. The invention itself, together with additional objects and advantages thereof, will be more clearly understood from a reading of the following description in connection with the accompanying drawings wherein a preferred embodiment of this invention is illustrated and in which:

Figures 1, 2, 4:
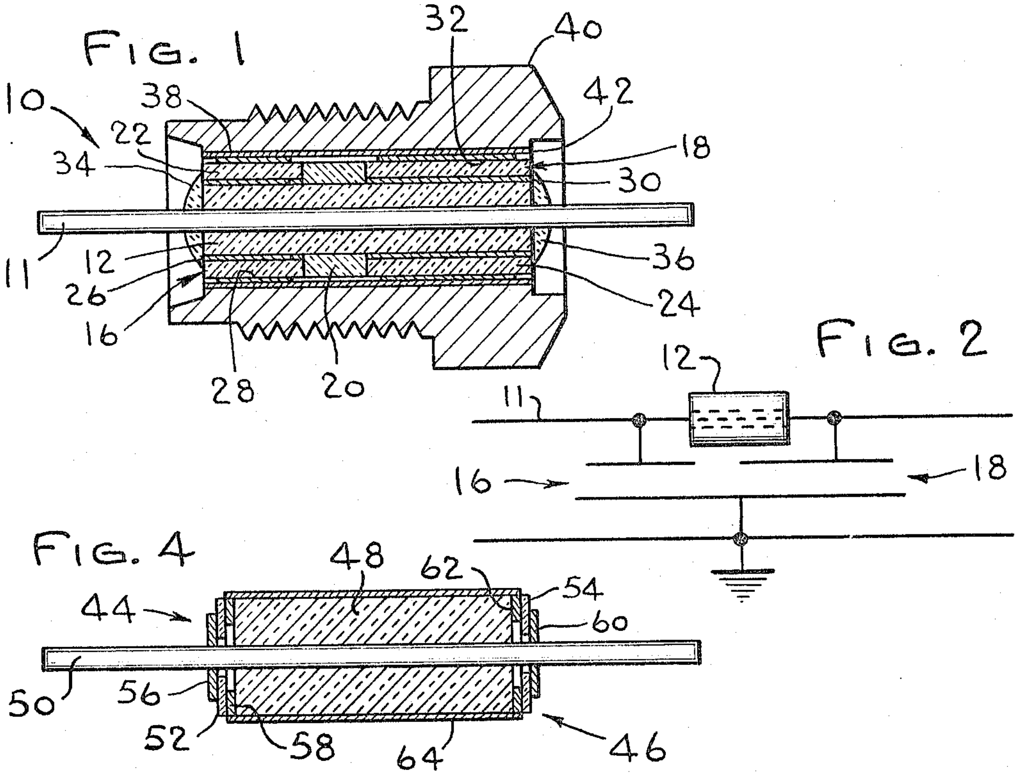
FIG. 1 is a longitudinal section of the filter.
FIG. 2 is a schematic electric circuit diagram for the filter.
FIG. 4 illustrates an alternate embodiment.

With particular reference to the drawings, a generally cylindrical filter 10 is illustrated as including a through conductor 11 and a body 12 disposed in surrounding relation to the conductor. In conventional filters body 12 is usually composed of a material known as ferrite and such a material can be used in this invention if desired; however, as will be discussed more completely hereinafter, further consideration can be given to the material depending upon whether it is desired to improve the low or high frequency characteristics of the filter. In any event, body 12 is inductively related with conductor 11 and, at high frequencies, produces a substantial impedance. Therefore, body 12 will for convenience be referred to as an impedance member throughout the remainder of this specification.

Filter 10 also includes a pair of capacitor assemblies 16 and 18 preferably disposed in surrounding relationship to impedance member 12. A spacer 20 of suitable electrical insulating material, such as steatite, is disposed between the capacitor assemblies isolating one from the other, the particular considerations to be given to selection of the material for spacer 20 will be discussed more completely hereinafter. Capacitor assemblies 16 and 18 include body portions 22 and 24, respectively of reduced titanate, a semi-conductor which can be produced in any suitable manner, for example in accordance with the teachings of U.S. Patent 2,841,508 for "Electrical Circuit Elements," dated July 1, 1958 which patent also contains an example of a formulation which can be used for the bodies, i.e. body portions 22 and 24 can be made from a mix comprising 84.5 percent barium titanate, 15 percent strontium titanate and 0.5 percent mixture of rare earths.

Capacitor assembly 16 includes a film 26 on its inner surface and a film 28 on its outer surface. These films can be of suitable electrically conductive materials such as a silver coating, with film 26 extending the length of body 22 and film 28 terminating in spaced relation from the ends of that body. Capacitor assembly 18 similarly includes conductive films 30 and 32 on its inner and outer surfaces, these films being identically arranged relative to body 24 as films 26 and 28 are arranged to body 22.

Figure 3:
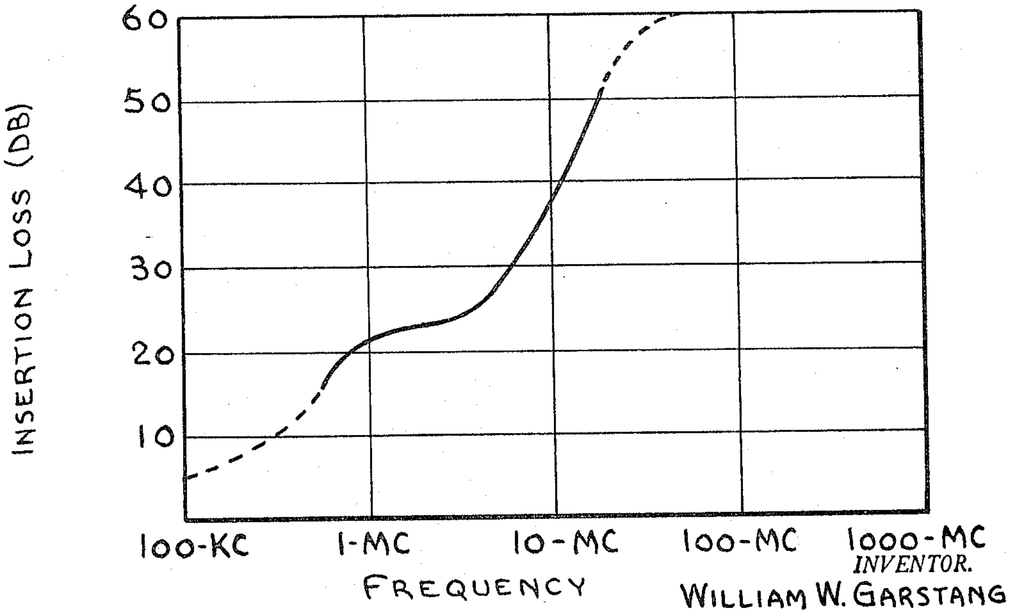
FIG. 3 is a plotting of insertion loss against frequency.

Solder caps 34 and 36 electrically connect conductor 11 to inner conductive films 26 and 30. The filter assembly is positioned within a bore 38 of a mounting stud 40, this assembly is solder dipped to provide a solder film 42 rigidly connecting the filter in the stud and also electrically connecting both outer conductive films 28 and 32 through the stud to ground. Accordingly, filter 10 includes reduced titanate capacitor assemblies 16 and 18 and, as more completely described in U.S. Patent 2,841,508, has an appreciably greater capacitance as compared to a conventional capacitor of similar size, the ratio being approximately 100 to 1, producing an increase in the useful range of the filter without increasing its size. Patent No. 2,841,508 discusses other electrical characteristics exhibited by reduced titanates of this type and reliance is placed on the disclosure of that patent for a more complete discussion of the electrical characteristics of reduced titanate. In capacitors of the same physical size, an increase in capacitance in excess of 100 times that obtained from an unreduced barium titanate is achieved through the use of reduced barium titanate. Using reduced titanate as the dielectric medium in the capacitors of the filter of FIG. 1 takes advantage of this increase and provides a filter circuit element which achieves effective attenuation in low frequency ranges, i.e. below 50–100 megacycles and into the range of one megacycle and below as illustrated in FIG. 3.

As can be seen in FIG. 2, the preferred construction of a filter in accordance with this invention results in a pi-section filter wherein impedance member 12 surrounds and is inductively related with through conductor 11 and capacitor assemblies 16 and 18 are connected in parallel across through conductor 11 and ground. However, it should be understood that variations can be made in this arrangement without departing from the scope of this invention. For example, either of the capacitor assemblies 16 or 18 can be eliminated leaving an L-section filter with one reduced titanate capacitor assembly, this L-section filter would still exhibit the improved filtering characteristics described above due to the increased capacitance of the capacitor assembly.

As was stated hereinabove, any one of a number of materials can be used for body 12, however, special consideration should be given to the selection of this material depending upon whether high or low frequency operation of the filter is being emphasized. For example, to further improve the low frequency characteristics of the filter, it is preferred to use, instead of conventional ferrite, an iron powder or a combination of iron powder and ferrite. Where emphasis is placed on high frequency characteristics of the filter it is preferred to use a lossy type ferrite. At high frequencies these filters can be considered as brute-force filters where body 12 functions as an impedance, loss factor, rather than the conventional inductance. Lossy type ferrites exhibit an extremely high loss factor (heat, hysteresis, eddy current losses, etc.) and when used in combination with reduced titanates, which also have a high loss factor, the loss factors are compounded thereby improving the high frequency characteristics of the filter. In this regard, it should be noted that reduced titanate capacitors have relatively high power factors making their use particularly beneficial in brute-force filters.

It is recognized that the use of a ferrite body 12 presents the problem of a possible reduction in attenuation factor because of saturation of the ferrite due to high D.C. currents. To eliminate this possibility, the ferrite body can be split to introduce an air gap which will eliminate the saturation factor.

Where, as illustrated, more than one capacitor assembly is provided such as in a pi-section filter, it is proposed to provide capacitor assemblies 16 and 18 with different capacitances, e.g. .14 mf. and .10 mf. However, it will be appreciated that capacitors having the same value can be used without departing from the scope of this invention. In this embodiment the capacitance values are varied by providing different lengths of capacitance elements as is readily apparent in the drawings, however, any other convenient means of providing different capacitances can be utilized. The use of capacitors of different value is preferred as it deresonates the filter and produces a cascading effect. More particularly, providing two capacitor assemblies of different capacitance produces a reduction in the points, within the useful range of the filter, at which the capacitor assemblies will resonate and are incapable of filtering. The areas of resonance being reduced, the effectiveness of the filter within its useful range is increased accordingly. Further reductions in the resonant areas can be achieved by utilizing additional capacitive elements all with different capacitance values. Further in this regard, it should be noted that although separator 20 can be of any suitable electrical insulating material, preferably a low dielectric constant material, it has been observed that use of a semi-high dielectric constant material has a beneficial effect on this cascading characteristic of the filter.

It should also be noted that it is possible that separator 20 could be completely eliminated and only a split electrode provided on the inner surface of a continuous tubular reduced titanate element. But, since the semiconductor characteristics of the reduced titanates are not completely known, the danger exists that the by-passing effect of the reduced titanates may be such as to render the split electrodes ineffective. Therefore the preferred construction of the filter incorporates individual capacitor assemblies separated by an insulating spacer.

FIG. 3 is an average plotting of the results of testing of a number of filters constructed in accordance with this invention.

It will be understood that the structural arrangement of the filter elements may be varied without departing from the scope of this invention. An example of an alternate structural arrangement is illustrated in FIG. 4 wherein a discoidal type capacitor structure is shown. Here capacitor assemblies 44 and 46 are located at the opposed ends of a generally cylindrical body member 48. A conductor 50 extends through body 48 with the conductor and body inductively related one to the other. Capacitor assemblies 44 and 46 include disk shaped reduced titanate members 52 and 54 respectively. Disk 52 has suitable electrically conductive films formed on its opposed faces to provide electrodes 56 and 58 and, similarly, disk 54 is provided with electrodes 60 and 62.

Electrodes 56 and 60 are electrically connected to conductor 50 and electrodes 58 and 62 are electrically interconnected by a metallic sleeve 64 which is suitably connected to ground. If desired, the filter assembly can be placed into a stud (not shown), as was done in FIG. 1, here the metallic sleeve could contact the stud or can be replaced by a solder film provided to hold the assembly within the stud. The solder film will electrically interconnect the electrodes 58 and 62 and, through the stud, connect them to ground. Hence, the schematic electrical circuit diagram for the embodiment of FIG. 4 will be identical to that illustrated in FIG. 2 for the embodiment of FIG. 1.

Reduced titanate bodies 52 and 54 can be formulated as discussed above, and body 48 can be a ferrite, lossy ferrite, iron powder, or a combination of ferrite and iron powder depending on the particular application and as discussed above. If desired, capacitor assemblies 44 and 46 can be provided with different capacitance values to deresonate the filter as discussed above.

The description and illustration of this invention in connection with a particular preferred embodiment thereof has been intended for illustrative purposes only and should not be taken by way of limitation. Accordingly, it is intended in the appended claims to cover all modifications and embodiments of this invention as fall within the true spirit and scope thereof.

What I claim is:

1. A broad band filter comprising, in combination, a through conductor, an impedance element inductively related with said conductor, and a pair of capacitor assemblies each including a reduced titanate portion having oppositely facing surfaces, electrically conductive means on the surfaces of each of said reduced titanate portions to provide a capacitance in excess of 100 times that obtained from a capacitor of same physical size but made of unreduced titanate, and means electrically connecting said capacitor assemblies in parallel circuit relationship in the circuit of said filter with said increased capacitance rendering said filter capable of providing attenuation below 50–100 megacycles.

2. A broad band filter comprising, in combination, a through conductor, a generally tubular impedance element disposed in surrounding relationship with said conductor, a pair of tubular reduced titanate members positioned in axial spaced relationship on said impedance element, electrical insulating means positioned axially between said reduced titanate members, the inner and outer surface of each of said titanate members provided with a conductive coating to provide capacitors having a capacitance substantially in excess of that obtained from a capacitor of same physical size but made of unreduced titanate, and means connecting said capacitors in parallel circuit relationship in the circuit of said filter with said increased capacitance rendering said filter capable of providing attenuation at frequencies in the range of one megacycle and below.

3. The combination of claim 2 wherein said broad band filter is connected within an electrically conductive mounting stud and includes means for electrically connecting the outer coating of said titanate members to said stud and the inner coating to said through conductor.

4. The combination of claim 2 wherein said impedance element comprises a powdered iron.

5. The combination of claim 2 wherein said impedance element comprises a lossy ferrite.

6. The combination of claim 2 wherein the capacitor assemblies formed with said reduced titanate members have different capacitance values.

7. A broad band filter comprising, in combination, a through conductor, a generally tubular impedance element disposed in surrounding relationship with said conductor, a pair of disk shaped reduced titanate members disposed at the opposite ends of said impedance element, the oppositely facing surfaces of each of said reduced titanate members provided with a conductive coating to provide capacitors having a capacitance substantially 100 times that obtained from a capacitor of same physical size but made of unreduced titanate, and means connecting said capacitors in parallel circuit relationship in the circuit of said filter so that said filter is capable of providing attenuation below 50–100 megacycles.

8. The combination of claim 7 wherein the coating on one of the faces of each of said reduced titanate members is electrically connected to said through conductor and including means for electrically interconnecting the coatings on the other faces of each of said reduced titanate members.

9. The combination of claim 8 wherein said interconnecting means comprises a conductive sleeve.

10. The combination of claim 7 wherein said capacitor assemblies formed with said reduced titanate members have different capacitance values.

References Cited by the Examiner

UNITED STATES PATENTS

| | | | |
|---|---|---|---|
| 2,538,771 | 1/1951 | Feenberg | 333—81 |
| 2,549,424 | 4/1951 | Carlson | 333—79 |
| 2,633,543 | 4/1953 | Howatt | 310—9.8 |
| 2,759,155 | 8/1956 | Hackenberg | 333—79 |
| 2,782,381 | 2/1957 | Dyke | 333—81 |
| 2,821,490 | 1/1958 | Dunegan | 317—237 |
| 2,841,508 | 7/1958 | Roup et al. | 117—200 |
| 2,973,490 | 2/1961 | Schlicke | 333—79 |
| 2,983,855 | 5/1961 | Schlicke | 333—79 |
| 3,007,121 | 10/1961 | Schlicke | 333—79 |
| 3,028,248 | 4/1962 | Glaister | 106—39 |
| 3,035,237 | 5/1962 | Schlicke | 333—79 |
| 3,076,947 | 2/1963 | Davidson | 333—79 |
| 3,200,355 | 5/1965 | Dahlen | 333—79 |

HERMAN KARL SAALBACH, *Primary Examiner.*

C. BARAFF, *Assistant Examiner.*